(12) United States Patent
Montreuil et al.

(10) Patent No.: US 12,355,687 B2
(45) Date of Patent: Jul. 8, 2025

(54) DISTRIBUTED TONE PLAN

(71) Applicant: Avago Technologies International Sales Pte. Limited, Singapore (SG)

(72) Inventors: Leo Montreuil, Atlanta, GA (US); Ron Porat, San Diego, CA (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 501 days.

(21) Appl. No.: 17/838,123

(22) Filed: Jun. 10, 2022

(65) Prior Publication Data
US 2023/0006782 A1 Jan. 5, 2023

Related U.S. Application Data

(60) Provisional application No. 63/222,371, filed on Jul. 15, 2021, provisional application No. 63/217,153, filed on Jun. 30, 2021.

(51) Int. Cl.
H04W 4/00 (2018.01)
H04L 5/00 (2006.01)
H04W 72/0453 (2023.01)

(52) U.S. Cl.
CPC ............ H04L 5/003 (2013.01); H04L 5/0007 (2013.01); H04L 5/0094 (2013.01); H04W 72/0453 (2013.01)

(58) Field of Classification Search
CPC ..... H04L 5/003; H04L 5/0007; H04L 5/0094; H04W 72/0453
USPC ........................................................ 370/329
See application file for complete search history.

(56) References Cited

U.S. PATENT DOCUMENTS

| 11,343,035 | B2* | 5/2022 | Chen | H04L 1/0071 |
| 11,509,416 | B1* | 11/2022 | Chen | H04L 1/0011 |
| 11,784,683 | B2* | 10/2023 | Seok | H04L 5/00 370/329 |
| 11,818,698 | B2* | 11/2023 | Yang | H04L 27/2602 |
| 11,870,735 | B2* | 1/2024 | Hu | H04L 5/0048 |
| 11,888,770 | B2* | 1/2024 | Yang | H04W 72/0453 |
| 11,889,532 | B2* | 1/2024 | Agrawal | H04B 1/0053 |
| 11,937,251 | B2* | 3/2024 | Lin | H04W 72/23 |
| 11,973,707 | B2* | 4/2024 | Hu | H04L 5/0007 |

(Continued)

OTHER PUBLICATIONS

Extended European Search Report from European Patent Application No. 22181592.1, dated Nov. 7, 2022, 10 pages.

*Primary Examiner* — Marceau Milord
(74) *Attorney, Agent, or Firm* — Foley & Lardner LLP

(57) ABSTRACT

An electronic device is provided that includes a wireless network interface and at least one processor coupled to the wireless network interface. The at least one processor is configured to select a resource unit from a tone plan, notify another electronic device of the selected resource unit via the wireless network interface, and communicate data with the other electronic device using the selected resource unit via the wireless network interface. The tone plan is characterized by a first tone sub-plan comprising a first plurality of resource units having a first size, wherein each resource unit of the first plurality of resource units includes a respective plurality of tones from a contiguous range of tones, and wherein the tones of each respective plurality of tones have a spacing in the contiguous range of tones of an integer multiple of a first factor greater than one.

17 Claims, 8 Drawing Sheets

(56) References Cited

U.S. PATENT DOCUMENTS

| | | | |
|---|---|---|---|
| 11,979,234 B2* | 5/2024 | Park | H04L 1/0079 |
| 11,996,939 B2* | 5/2024 | Jang | H04L 1/0041 |
| 12,082,178 B1* | 9/2024 | Chu | H04W 72/0453 |
| 2016/0353300 A1* | 12/2016 | Lutz | H04W 24/08 |
| 2017/0006608 A1* | 1/2017 | Josiam | H04L 5/001 |
| 2017/0181136 A1* | 6/2017 | Bharadwaj | H04W 72/0453 |
| 2017/0302417 A1* | 10/2017 | Chun | H04L 1/0025 |
| 2017/0331605 A1* | 11/2017 | Shani | H04L 25/0204 |
| 2019/0253296 A1* | 8/2019 | Chen | H04L 27/2605 |
| 2020/0014509 A1 | 1/2020 | Asterjadhi | |
| 2021/0045151 A1* | 2/2021 | Chen | H04W 74/004 |
| 2021/0127291 A1* | 4/2021 | Chen | H04W 28/0231 |
| 2021/0143955 A1* | 5/2021 | Yang | H04L 5/003 |
| 2021/0144695 A1* | 5/2021 | Agrawal | H04W 72/541 |
| 2021/0160889 A1* | 5/2021 | Yang | H04W 72/542 |
| 2021/0281454 A1* | 9/2021 | Yang | H04L 27/2603 |
| 2021/0288768 A1* | 9/2021 | Yang | H04L 5/0044 |
| 2021/0288769 A1* | 9/2021 | Yang | H04L 5/0041 |
| 2021/0289500 A1* | 9/2021 | Yang | H04W 72/0453 |
| 2021/0314113 A1* | 10/2021 | Chen | H04L 5/0044 |
| 2022/0038250 A1* | 2/2022 | Hu | H04L 27/2602 |
| 2022/0045725 A1* | 2/2022 | Seok | H04B 7/0417 |
| 2022/0150009 A1* | 5/2022 | Hu | H04L 5/0046 |
| 2022/0353049 A1* | 11/2022 | Yang | H04L 5/0041 |
| 2022/0369315 A1* | 11/2022 | Yang | H04L 27/26132 |
| 2022/0376824 A1* | 11/2022 | Sun | H04L 1/1614 |
| 2023/0035113 A1* | 2/2023 | Shellhammer | H04L 5/0041 |
| 2023/0104295 A1* | 4/2023 | Yang | H04L 27/2613 370/329 |
| 2023/0124579 A1* | 4/2023 | Yang | H04L 5/0092 370/328 |
| 2024/0056220 A1* | 2/2024 | Park | H04L 27/2602 |
| 2024/0171339 A1* | 5/2024 | Yang | H04W 52/0216 |

* cited by examiner

| RU26 | RU52 | RU106 |
|---|---|---|
| $RU26_1 = [-119:9:-11, 7:9:115]$ | $RU52_1 = [RU26_1, RU26_2]$ | $RU106_1 = [RU52_1, RU52_2, -122, 4]$ |
| $RU26_2 = [-115:9:-7, 11:9:119]$ | | |
| $RU26_3 = [-117:9:-9, 9:9:117]$ | $RU52_2 = [RU26_3, RU26_4]$ | |
| $RU26_4 = [-113:9:-5, 13:9:121]$ | | |
| $RU26_5 = [-120:9:-12, 6:9:114]$ | | |
| $RU26_6 = [-118:9:-10, 8:9:116]$ | $RU52_3 = [RU26_6, RU26_7]$ | $RU106_2 = [RU52_3, RU52_4, -121, 3]$ |
| $RU26_7 = [-114:9:-6, 12:9:120]$ | | |
| $RU26_8 = [-116:9:-8, 10:9:118]$ | $RU52_4 = [RU26_8, RU26_9]$ | |
| $RU26_9 = [-112:9:-4, 14:9:122]$ | | |

*FIG. 3A*

| RU26 | RU52 | RU106 |
|---|---|---|
| $RU26_1 = [-120:9:-12, 6:9:114]$ | $RU52_1 = [RU26_1, RU26_2]$ | $RU106_1 = [RU52_1, RU52_2, -3, 3]$ |
| $RU26_2 = [-116:9:-8, 10:9:118]$ | | |
| $RU26_3 = [-118:9:-10, 8:9:116]$ | $RU52_2 = [RU26_3, RU26_4]$ | |
| $RU26_4 = [-114:9:-6, 12:9:120]$ | | |
| $RU26_5 = [-112:9:-4, 5:9:113]$ | | |
| $RU26_6 = [-119:9:-11, 7:9:115]$ | $RU52_3 = [RU26_6, RU26_7]$ | $RU106_2 = [RU52_3, RU52_4, -2, 2]$ |
| $RU26_7 = [-115:9:-7, 11:9:119]$ | | |
| $RU26_8 = [-117:9:-9, 9:9:117]$ | $RU52_4 = [RU26_8, RU26_9]$ | |
| $RU26_9 = [-113:9:-5, 4:9:112]$ | | |

*FIG. 3B*

| dRU26 | dRU52 | dRU106 | dRU242 |
|---|---|---|---|
| $RU26_1 = [-238:18:-22, 14:18:230]$ | $RU52_1 = [-238:9:-13, 5:9:230]$ | $RU106_1 = [RU52_1, RU52_2, -4, 239]$ | $RU242_1 = [-244, -242, RU106_1, RU26_5, RU106_2, 4, 244]$ |
| $RU26_2 = [-229:18:-13, 5:18:221]$ | | | |
| $RU26_3 = [-234:18:-18, 18:18:234]$ | $RU52_2 = [-234:9:-9, 9:9:234]$ | | |
| $RU26_4 = [-225:18:-9, 9:18:225]$ | | | |
| $RU26_5 = [-230:18:-14, 22:18:238]$ | | | |
| $RU26_6 = [-236:18:-20, 16:18:232]$ | $RU52_3 = [-236:9:-11, 7:9:232]$ | $RU106_2 = [RU52_3, RU52_4, -241, 241]$ | |
| $RU26_7 = [-227:18:-11, 7:18:223]$ | | | |
| $RU26_8 = [-232:18:-16, 20:18:236]$ | $RU52_4 = [-232:9:-7, 11:9:236]$ | | |
| $RU26_9 = [-223:18:-7, 11:18:227]$ | | | |
| $RU26_{10} = [-237:18:-21, 15:18:231]$ | $RU52_5 = [-237:9:-12, 6:9:231]$ | $RU106_3 = [RU52_5, RU52_6, -3, 240]$ | $RU242_2 = [-243, -239, RU106_3, RU26_{14}, RU106_4, 242, 243]$ |
| $RU26_{11} = [-228:18:-12, 6:18:222]$ | | | |
| $RU26_{12} = [-233:18:-17, 19:18:235]$ | $RU52_6 = [-233:9:-8, 10:9:235]$ | | |
| $RU26_{13} = [-224:18:-8, 10:18:226]$ | | | |
| $RU26_{14} = [-221:18:-5, 13:18:229]$ | | | |
| $RU26_{15} = [-235:18:-19, 17:18:233]$ | $RU52_7 = [-235:9:-10, 8:9:233]$ | $RU106_4 = [RU52_7, RU52_8, -240, 3]$ | |
| $RU26_{16} = [-226:18:-10, 8:18:224]$ | | | |
| $RU26_{17} = [-231:18:-15, 21:18:237]$ | $RU52_8 = [-231:9:-6, 12:9:237]$ | | |
| $RU26_{18} = [-222:18:-6, 12:18:228]$ | | | |

*FIG. 4*

| dRU26 | dRU52 | dRU106 | dRU242 | dRU484 |
|---|---|---|---|---|
| $RU26_1 = [-462:36:-30, 42:36:474]$ | $RU52_1 =$ $[RU26_1, RU26_2]$ | $RU106_1 =$ $[-489,$ $RU52_1, RU52_2,$ $492]$ | $RU242_1 =$ $[-498, -17,$ $RU106_1, RU26_5,$ $RU106_2,$ $491, 497]$ | $RU484_1 =$ $[RU242_1,$ $RU242_2]$ |
| $RU26_2 = [-480:36:-48, 24:36:456]$ | | | | |
| $RU26_3 = [-453:36:-21, 51:36:483]$ | $RU52_2 =$ $[RU26_3, RU26_4]$ | | | |
| $RU26_4 = [-471:36:-39, 33:36:465]$ | | | | |
| $RU26_5 = [-463:36:-31, 41:36:473]$ | | | | |
| $RU26_6 = [-458:36:-26, 46:36:478]$ | $RU52_3 =$ $[RU26_6, RU26_7]$ | $RU106_2 =$ $[-494,$ $RU52_3, RU52_4,$ $487]$ | | |
| $RU26_7 = [-476:36:-44, 28:36:460]$ | | | | |
| $RU26_8 = [-485:36:-53, 19:36:451]$ | $RU52_4 =$ $[RU26_8, RU26_9]$ | | | |
| $RU26_9 = [-467:36:-35, 37:36:469]$ | | | | |
| $RU26_{10} = [-460:36:-28, 44:36:476]$ | $RU52_5 =$ $[RU26_{10}, RU26_{11}]$ | $RU106_3 =$ $[-487,$ $RU52_5, RU52_6,$ $494]$ | $RU242_2 =$ $[-499, -496,$ $RU106_3, RU26_{14},$ $RU106_4,$ $17, 498]$ | |
| $RU26_{11} = [-478:36:-46, 26:36:458]$ | | | | |
| $RU26_{12} = [-451:36:-19, 53:36:485]$ | $RU52_6 =$ $[RU26_{12}, RU26_{13}]$ | | | |
| $RU26_{13} = [-469:36:-37, 35:36:467]$ | | | | |
| $RU26_{14} = [-481:36:-49, 23:36:455]$ | | | | |
| $RU26_{15} = [-456:36:-24, 48:36:480]$ | $RU52_7 =$ $[RU26_{15}, RU26_{16}]$ | $RU106_4 =$ $[-492,$ $RU52_7, RU52_8,$ $489]$ | | |
| $RU26_{16} = [-474:36:-42, 30:36:462]$ | | | | |
| $RU26_{17} = [-483:36:-51, 21:36:453]$ | $RU52_8 =$ $[RU26_{17}, RU26_{18}]$ | | | |
| $RU26_{18} = [-465:36:-33, 39:36:471]$ | | | | |

| dRU26 | dRU52 | dRU106 | dRU242 | dRU484 |
|---|---|---|---|---|
| $RU26_{20} = [-459:36:-27, 45:36:477]$ | $RU52_9 =$ $[RU26_{20}, RU26_{21}]$ | $RU106_5 =$ $[-495,$ $RU52_9, RU52_{10},$ $486]$ | $RU242_3 =$ $[-500, -18,$ $RU106_5, RU26_{24},$ $RU106_6,$ $495, 500]$ | $RU484_2 =$ $[RU242_3,$ $RU242_4]$ |
| $RU26_{21} = [-477:36:-45, 27:36:459]$ | | | | |
| $RU26_{22} = [-486:36:-54, 18:36:450]$ | $RU52_{10} =$ $[RU26_{22}, RU26_{23}]$ | | | |
| $RU26_{23} = [-468:36:-36, 36:36:468]$ | | | | |
| $RU26_{24} = [-454:36:-22, 50:36:482]$ | | | | |
| $RU26_{25} = [-455:36:-23, 49:36:481]$ | $RU52_{11} =$ $[RU26_{25}, RU26_{26}]$ | $RU106_6 =$ $[-491,$ $RU52_{11}, RU52_{12},$ $490]$ | | |
| $RU26_{26} = [-473:36:-41, 31:36:463]$ | | | | |
| $RU26_{27} = [-482:36:-50, 22:36:454]$ | $RU52_{12} =$ $[RU26_{27}, RU26_{28}]$ | | | |
| $RU26_{28} = [-464:36:-32, 40:36:472]$ | | | | |
| $RU26_{29} = [-461:36:-29, 43:36:475]$ | $RU52_{13} =$ $[RU26_{29}, RU26_{30}]$ | $RU106_7 =$ $[-488,$ $RU52_{13}, RU52_{14},$ $493]$ | $RU242_4 =$ $[-497, -490,$ $RU106_7, RU26_{33},$ $RU106_8,$ $496, 499]$ | |
| $RU26_{30} = [-479:36:-47, 25:36:457]$ | | | | |
| $RU26_{31} = [-452:36:-20, 52:36:484]$ | $RU52_{14} =$ $[RU26_{31}, RU26_{32}]$ | | | |
| $RU26_{32} = [-470:36:-38, 34:36:466]$ | | | | |
| $RU26_{33} = [-472:36:-40, 32:36:464]$ | | | | |
| $RU26_{34} = [-457:36:-25, 47:36:479]$ | $RU52_{15} =$ $[RU26_{34}, RU26_{35}]$ | $RU106_8 =$ $[-493,$ $RU52_{15}, RU52_{16},$ $488]$ | | |
| $RU26_{35} = [-475:36:-43, 29:36:461]$ | | | | |
| $RU26_{36} = [-484:36:-52, 20:36:452]$ | $RU52_{16} =$ $[RU26_{36}, RU26_{37}]$ | | | |
| $RU26_{37} = [-466:36:-34, 38:36:470]$ | | | | |

*FIG. 5B*

DISTRIBUTED TONE PLAN

This application claims the benefit of U.S. Provisional Application No. 63/217,153, filed on Jun. 30, 2021, and the benefit of U.S. Provisional Application No. 63/222,371, filed on Jul. 15, 2021, the contents of which are incorporated herein by reference.

TECHNICAL FIELD

The present description relates generally to wireless communications including, for example, management of radio spectrum used for wireless communications.

BACKGROUND

Wireless communications use frequency bands allocated from the radio spectrum to transfer data between electronic devices. The frequency bands may be divided into channels that are modulated with data to be transferred between the electronic devices. Modulation schemes such as orthogonal frequency-division multiplexing (OFDM) and orthogonal frequency-division multiple access (OFDMA) may divide the channels into multiple sub-carriers or tones. A data stream may be divided into multiple sub-streams that are used to modulate respective sub-carriers or tones transmitted in parallel between the electronic devices.

BRIEF DESCRIPTION OF THE DRAWINGS

Certain features of the subject technology are set forth in the appended claims. However, for purpose of explanation, several embodiments of the subject technology are set forth in the following figures.

FIGS. 3A and 3B are diagrams outlining two distributed tone plans for a 20 MHz channel in accordance with aspects of the subject technology.

FIG. 4 is a diagram illustrating a distributed tone plan for a 40 MHz channel according to aspects of the subject technology.

FIGS. 5A and 5B are diagrams illustrating a distributed tone plan for an 80 MHz channel according to aspects of the subject technology.

DETAILED DESCRIPTION

Figure 1:
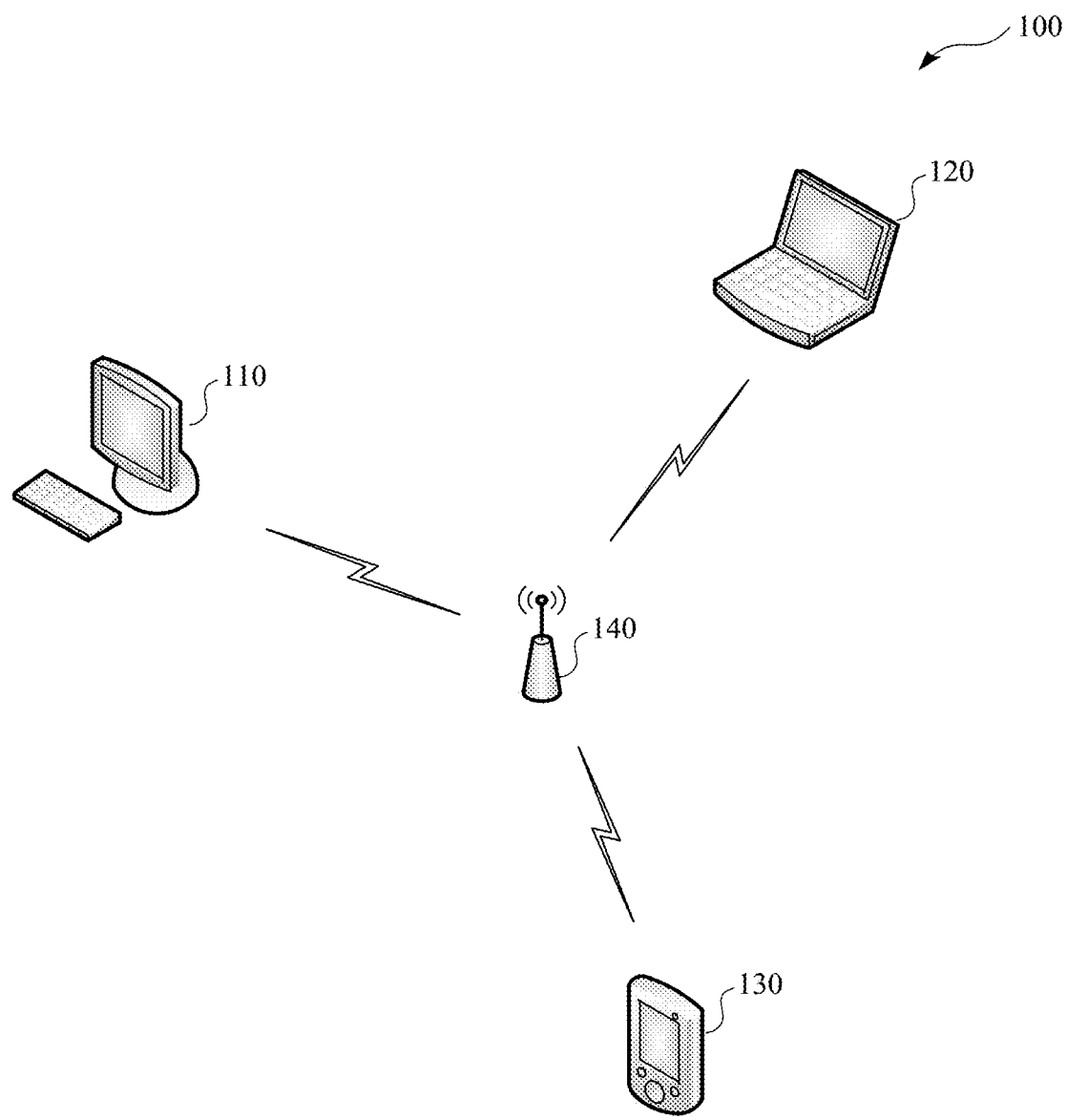
FIG. 1 illustrates an example network environment in which wireless communications may be implemented in accordance with aspects of the subject technology.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

Wireless communications use frequency bands allocated from the radio spectrum to transfer data between electronic devices. The frequency bands may be divided into channels that are modulated with data to be transmitted between the electronic devices. Modulation schemes such as orthogonal frequency-division multiplexing (OFDM) and orthogonal frequency-division multiple access (OFDMA) may divide a channel into multiple orthogonal sub-carriers or tones. The sub-carriers or tones may be equally spaced across the channel with an equal allocation of bandwidth to each sub-carrier or tone. The sequence of sub-carriers or tones positioned at each instance of a regular interval across the channel represents a contiguous range of sub-carriers or tones. A data stream may be divided into multiple sub-streams that are used to modulate respective sub-carriers or tones that are transmitted in parallel between electronic devices. For purposes of this description, the terms "sub-carrier" and "tone" are synonymous and may be used interchangeably.

Under an OFDMA modulation scheme, the tones of a channel may be allocated or divided into resource units. A resource unit may be a set of multiple tones that are assignable as a unit to an electronic device for communications with that electronic device. The size of a resource unit may refer to the number of tones allocated to that resource unit and may vary. A channel may have more than one resource unit of a given size and a particular tone may be allocated to multiple resource units having different respective sizes. For example, a 20 MHz channel (e.g., 5150 MHz to 5170 MHz in a 5 GHz frequency band) may be divided into 256 tones each having a bandwidth of 78.125 kHz, with 242 of the tones being available for transmission. The tones of the 20 MHz channel may be allocated across nine resource units with 26 tones per resource unit (RU26), across four resource units with 52 tones per resource unit (RU52), across two resource units with 106 tones per resource unit (RU106), and/or to a single resource unit having 242 tones (RU242). This allocation of tones is presented as an example and is not intended to limit the scope of the subject technology.

A tone plan may identify the different resource units available in a channel and the tones allocated to each resource unit. The tone plan may be stored as a data structure that is referenced by an electronic device, such as an access point or base station, when managing wireless communication links with other electronic devices. For example, an electronic device may select a resource unit from the tone plan and assign that resource unit for communications with another electronic device. Communications between the two electronic devices are facilitated by modulating the tones allocated to the selected resource unit with data being transferred between the electronic devices. The size of the resource unit selected may vary depending on the bandwidth needs and/or the priority of data traffic between the electronic devices. In addition, more than one resource unit of the same size or of different sizes may be selected and assigned for communications between a pair of electronic devices.

Frequency bands allocated for wireless communications may have regulatory limitations placed on their use. For example, transmissions using a particular frequency band may have a maximum allowable power spectral density (e.g., −1 dBm/MHz). Limiting the power spectral density limits the operational range of a system using that frequency band. The subject technology proposes to spread out the tones allocated to a resource unit across a wider bandwidth relative to the bandwidth that would be covered if contiguous tones were allocated. In this manner, transmission power and range can be increased using the spread-out tones compared to the contiguous tones while still complying with power spectral density limitations. Furthermore, the subject technology proposes to regularly space the tones allocated from the contiguous range of tones of a given channel in order to reduce the peak to average power ratio (PAPR) compared to an allocation of tones that are irregularly spaced. Reducing the PAPR may increase the efficiency of power amplifiers used in transmission circuits. These and other advantages will be apparent based on the further description below.

FIG. 1 illustrates an example network environment in which wireless communications may be implemented in accordance with aspects of the subject technology. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

As depicted in FIG. 1, network environment 100 includes electronic devices 110, 120, 130, and 140. Electronic device 140 may be a base station/access point configured to establish wireless connections with one or more of electronic device 110, 120, and 130 and base station/access point 140 as part of a wireless local area network (WLAN). In addition, electronic devices 110, 120, and 130 may be configured to establish wireless connections directly with each other for wireless communications between the electronic devices. The wireless communications may utilize protocols specified in one or more standards such as the Institute of Electrical and Electronics Engineers (IEEE) 802.11x family of standards.

In FIG. 1, electronic device 110 is depicted as a computer, electronic device 120 is depicted as a laptop computer, and electronic device 130 is depicted as a smartphone. The subject technology is not limited to these types of electronic devices. For example, one or more of electronic devices 110, 120, or 130 may be a portable computing device such as a laptop computer, a smartphone, a peripheral device (e.g., headphones, earbuds, wireless speakers, and the like), a tablet device, a set-top box, a content streaming device, a wearable device such as a smartwatch, a gaming console, a smart television, and the like. The electronic devices also may represent sensors, switches, controllers, cameras, and other electronic devices considered to be part of an Internet of Things (IoT). Each of electronic devices 110, 120, and 130, as well as base station/access point 140 may be, and/or may include all or part of, the electronic system discussed below with respect to FIG. 7.

According to aspects of the subject technology, base station/access point 140 may select a resource unit from a tone plan for wireless communications with one or more of electronic devices 110, 120, or 130. Base station/access point 140 may notify the electronic device of the selected resource unit and subsequent communications of packets, frames, symbols, etc. may be made between the two electronic devices using the tones of the selected resource unit. Different resource units may be selected for communications with different electronic devices. In addition, different resource units may be selected for communications in different directions between two electronic devices.

Figure 2:
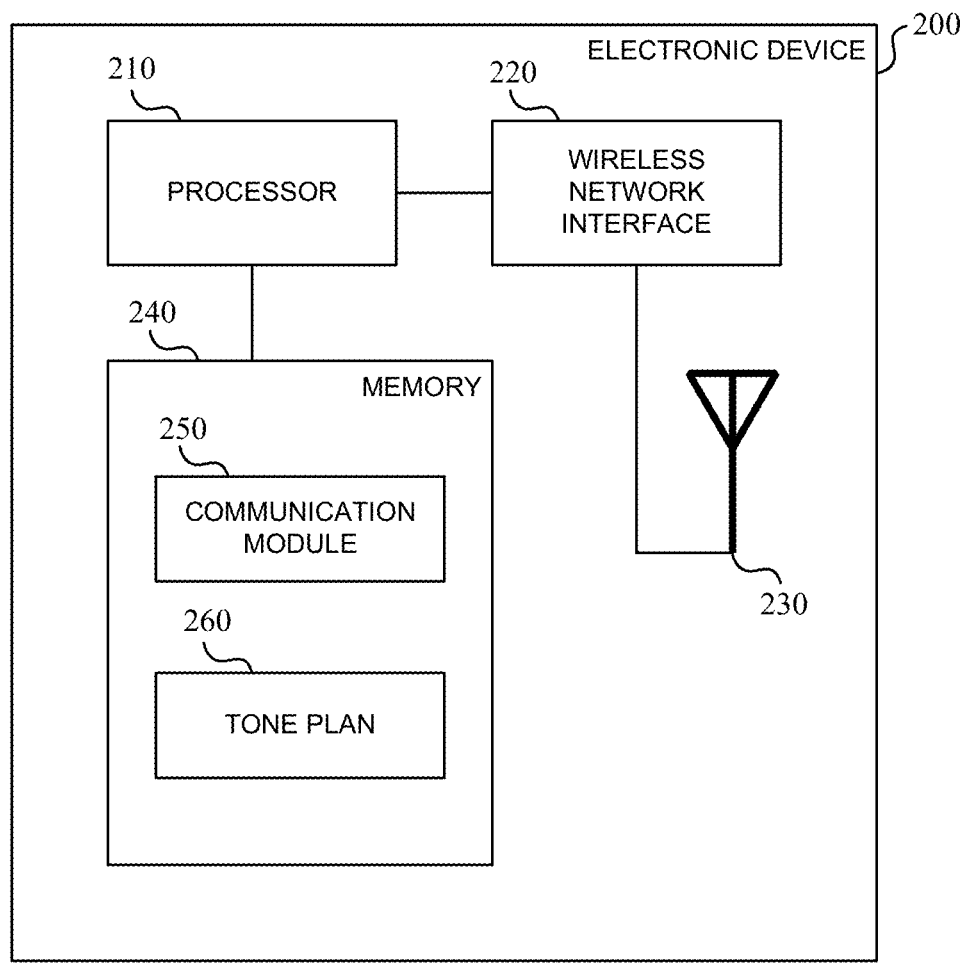
FIG. 2 is a block diagram illustrating components of an electronic device according to aspects of the subject technology.

FIG. 2 is a block diagram illustrating components of an electronic device according to aspects of the subject technology. Not all of the depicted components may be required, however, and one or more implementations may include additional components not shown in the figure. Variations in the arrangement and type of the components may be made without departing from the spirit or scope of the claims as set forth herein. Depicted or described connections or couplings between components are not limited to direct connections or direct couplings and may be implemented with one or more intervening components unless expressly stated otherwise.

In the example depicted in FIG. 2, electronic device 200 includes processor 210, wireless network interface 220, antenna 230, and memory 240. Processor 210 may include suitable logic, circuitry, and/or code that enable processing data and/or controlling operations of electronic device 200. In this regard, processor 210 may be enabled to provide control signals to various other components of electronic device 200. Processor 210 also may control transfers of data between various portions of electronic device 200. Additionally, processor 210 may enable implementation of an operating system or otherwise execute code to manage operations of electronic device 200.

Processor 210 or one or more portions thereof, may be implemented in software (e.g., instructions, subroutines, code), may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both.

Wireless network interface 220 may include suitable logic, circuitry, and/or code that enable the transmission and reception of tones of one or more channels modulated with data transmitted between electronic device 200 and another electronic device using antenna 230. Wireless network interface 220 may include encoders, decoders, filters, analog-to-digital converters, digital-to-analog converters, power amplifiers, etc. Antenna 230 is depicted as being internal to electronic device 200 but may be implemented external to electronic device 200. While one antenna element is depicted in FIG. 2, electronic device 200 may be implemented using multiple antenna elements in any configuration. The subject technology is not limited to any particular type, number, or arrangement of antenna elements.

Memory 240 may include suitable logic, circuitry, and/or code that enable storage of various types of information such as received data, generated data, code, and/or configuration information. Memory 240 may include, for example, random access memory (RAM), read-only memory (ROM), flash memory, magnetic storage, optical storage, etc. As depicted in FIG. 2, memory 240 contains communication module 250 and tone plan 260. The subject technology is not limited to these components both in number and type, and may be implemented using more components or fewer components than are depicted in FIG. 2.

According to aspects of the subject technology, communication module 250 comprises a computer program having one or more sequences of instructions or code together with associated data and settings. Upon processor 210 executing the instructions or code, one or more processes are initiated, for example, to establish and maintain wireless communication links with other electronic devices via wireless network interface 220, select resource units from tone plan 260 for the wireless communication links, and to facilitate communication of packets, frames, symbols, etc. between electronic device 200 and one or more other electronic devices via wireless network interface 220 using the tones allocated to the selected resource units. The size and number of resource units selected for communications with another electronic device may be selected based on a number of factors including, but not limited to, type of data (e.g., media stream, messaging, data storage, monitoring, etc.), expected data rate, quality-of-service (QoS) guarantees, and/or communication capabilities of the other electronic device.

According to aspects of the subject technology, tone plan 260 may be a data structure that includes data values identifying the different resource units available in a channel and the tones allocated to each resource unit. Tone plan 260 may include tone plans for multiple channels of different bandwidths. For example, tone plan 260 may include a tone plan for a 20 MHz channel, a 40 MHz channel, and/or an 80 MHz channel. The subject technology is not limited to this number of channels or these bandwidths and may be implemented for more or fewer channels having the same or different bandwidths.

FIG. 3A is a diagram illustrating a distributed tone plan for a 20 MHz channel according to aspects of the subject technology. Tone plan 300 depicted in FIG. 3A includes three tone sub-plans for different-sized resource units, respectively. The first tone sub-plan is for resource units each allocated 26 tones (RU26). The second tone sub-plan is for resource units each allocated 52 tones (RU52). The third tone sub-plan is for resource units each allocated 106 tones (RU106).

Turning to the first tone sub-plan for RU26, tones from a contiguous range of tones are distributed across the different RU26 resource units. Rather than allocating contiguous groups of tones to each resource unit, the subject technology allocates tones that are spaced apart from each other in the contiguous range of tones. For example, $RU26_1$ is allocated every ninth tone indexed in the contiguous range of tones starting at −119 to −11 and starting again at 7 to 115. Similarly, $RU26_2$ is allocated every ninth tone indexed in the contiguous range of tones starting at −115 to −7 and starting again at 11 to 119. This allocation pattern results in the tones allocated to each resource unit having a spacing in the contiguous range of tones of an integer multiple of a factor of nine. Specifically, the allocated tones have a spacing of nine apart from each other with the exception of the tones on either side of DC, which have a spacing of 18 (i.e., two times the factor of nine). The $RU26_3$ to $RU26_9$ resource units are allocated tones having the spacing of an integer multiple of the factor of nine but starting and ending at different index points.

The factor of nine used in this example is equal to the number of the RU26 resource units in the tone sub-plan. Using this factor maximizes the spread of the tones allocated to each resource unit across the 20 MHz channel, which allows transmission power to be boosted relative to tone plans that allocated contiguous tones to each resource unit while remaining within allowable PSD limits. For example, this allocation of tones across the RU26 resource units results in an average of 2 tones/MHz, which allows for a boost of 8.1 dB compared to conventional tone plans while still remaining with allowable PSD limits. The regular spacing of integer multiples of the factor of nine reduces the PAPR, which helps with the efficiency of the power amplifiers used to transmit the tones.

As indicated in the example depicted in FIG. 3A, the second tone sub-plan allocates the tones from two of the RU26 resource units to each of the RU52 resource units. For example, $RU52_1$ is allocated the tones allocated to $RU26_1$ and $RU26_2$, $RU52_2$ is allocated the tones allocated to $RU26_3$ and $RU26_4$, $RU52_3$ is allocated the tones allocated to $RU26_6$ and $RU26_7$, and $RU52_4$ is allocated the tones allocated to $RU26_8$ and $RU26_9$. Similarly, the third tone plan allocates the tones from two of the RU52 resource units, plus two additional tones, to each of the RU106 resource units. For example, $RU106_1$ is allocated the tones allocated to $RU52_1$ and $RU52_2$, plus tones indexed at −122 and 4 in the contiguous range of tones. Similarly, $RU106_2$ is allocated the tones allocated to $RU52_3$ and $RU52_4$, plus tones indexed at −121 and 3 in the contiguous range of tones. The allocation of tones for the second and third tone sub-plans may be designed to minimize the number of tones per a sliding 1 MHz window. A final RU242 resource unit, not presented in FIG. 3A, is allocated all 242 tones contiguously for data transmission in the 20 MHz channel.

According to aspects of the subject technology, the hierarchical structure of tone plan 300 represented in FIG. 3A may match the number of tone sub-plans, the number of resource units in each tone sub-plan, and the number of tones allocated to each of the resource units used in a conventional tone plan in which contiguous tones from the contiguous range of tones are allocated to each resource unit. In addition, the distributed tone plan 300 may use the same band edges and null tones as in a conventional tone plan. These design matches may allow the distributed tone plans of the subject technology to be implemented using the same RU allocation tables and with minimal changes to the hardware and/or code used in systems designed for conventional contiguous tone plans.

FIG. 3B is a diagram illustrating another distributed tone plan for a 20 MHz channel according to aspects of the subject technology. Tone plan 350 represented in FIG. 3B generally follows the allocation structure described above with respect to tone plan 300 represented in FIG. 3A. For example, the first tone sub-plan for the RU 26 resource units allocates 26 tones to each RU26 resource unit, where the tones have a spacing of an integer multiple of the factor of nine but using different index values for the respective allocations. The second tone sub-plan for the RU52 resource units allocates the 52 tones allocated to a respective pair of RU26 resource units to each RU52 resource unit. The third tone sub-plan for the RU106 resource units allocates tones allocated to a respective pair of RU52 resource units plus two additional tones. A final RU242 resource unit, not presented in FIG. 3B, is allocated all 242 tones contiguously for data transmission in the 20 MHz channel. The design considerations and advantages described above with respect to tone plan 300 also apply to tone plan 350.

FIG. 4 is a diagram illustrating a distributed tone plan for a 40 MHz channel according to aspects of the subject technology. Tone plan 400 depicted in FIG. 4 includes four tone sub-plans for resource units having different sizes. For example, a first tone sub-plan is for resource units each allocated 26 tones (RU26). A second tone sub-plan is for resource units each allocated 52 tones (RU52). A third tone sub-plan is for resource units each allocated 106 tones (RU106). A fourth tone sub-plan is for resource units each allocated 242 tones (RU242).

Regarding the first tone sub-plan for the RU26 resource units represented in tone plan 400, tones are allocated to the respective RU26 resource units in a manner similar to that described above with respect to the tone plan depicted in FIG. 3A. For example, each resource unit RU26 is allocated 26 tones from a contiguous range of tones where the tones have a spacing in the contiguous range of tones of an integer multiple of a factor of 18. The factor of 18 is equal to the number of RU26 resource units in the first tone sub-plan.

The second tone sub-plan represented in FIG. 4 identifies an allocation of 52 tones to each RU 52 resource unit. However, unlike the second tone sub-plan discussed above with respect to FIG. 3A which allocated the tones allocated to a respective pair of RU26 resource units, tone plan 400 allocates a respective 52 tones to each RU52 resource unit from a contiguous range of tones where the allocated tones have a spacing in the contiguous range of tones of an integer multiple of a factor of 9, which is half of the factor used in the first tone sub-plan. The third and fourth tone sub-plans in tone plan 400 allocate tones to the respective resource units in a manner similar to that described above with respect to the third tone sub-plan from FIG. 3A. For example, the tones allocated to a particular resource unit in the third and fourth tone sub-plans are a combination of tones allocated to smaller-sized resource units of the tone plan and additional individual tones from the contiguous range of tones. A final RU484 resource unit, not presented in FIG. 4, is allocated all 484 tones contiguously for data transmission in the 40 MHz channel.

FIGS. 5A and 5B are diagrams illustrating a distributed tone plan for an 80 MHz channel according to aspects of the subject technology. Tone plan 500A and 500B depicted in FIGS. 5A and 5B includes five tone sub-plans for resource units having different sizes. For example, a first tone sub-plan is for resource units each allocated 26 tones (RU26). A second tone sub-plan is for resource units each allocated 52 tones (RU52). A third tone sub-plan is for resource units each allocated 106 tones (RU106). A fourth tone sub-plan is for resource units each allocated 242 tones (RU242). A fifth tone sub-plan is for resource units each allocated 484 tones (RU484).

Regarding the first tone sub-plan for the RU26 resource units represented in tone plan 500A and 500B, tones are allocated to the respective RU26 resource units in a manner similar to that described above with respect to the tone plan depicted in FIG. 3A. For example, each resource unit RU26 is allocated 26 tones from a contiguous range of tones where the tones have a spacing in the contiguous range of tones of an integer multiple of a factor of 36. The factor of 36 is equal to the number of RU26 resource units in the first tone sub-plan. It is noted that resource unit $RU26_{19}$ is not a valid resource unit in this tone plan.

For the second tone sub-plan for RU52 resource units represented in FIGS. 5A and 5B, tones are allocated to the respective RU52 resource units in a manner similar to that described above with respect to the tone plan depicted in FIG. 3A. For example, each resource unit RU52 is allocated the tones allocated to a respective pair of RU26 resource units. The third, fourth, and fifth tone sub-plans depicted in FIGS. 5A and 5B allocate tones to the respective resource units in a manner similar to that described above with respect to the third tone sub-plan from FIG. 3A. For example, the tones allocated to a particular resource unit in the third, fourth, and fifth tone sub-plans are a combination of tones allocated to smaller-sized resource units of the tone plan and, for the third and fourth tone sub-plans, additional individual tones from the contiguous range of tones. A final RU996 resource unit, not presented in FIGS. 5A and 5B, is allocated all 996 tones contiguously for data transmission in the 80 MHz channel.

Returning to FIG. 2, processor 210 and communication module 250 in memory 240 may be implemented as a semiconductor device made up of processing circuitry (e.g., an Application Specific Integrated Circuit (ASIC), a Field Programmable Gate Array (FPGA), a Programmable Logic Device (PLD), a controller, a state machine, gated logic, discrete hardware components, or any other suitable devices) configured to perform the operations described above. The processing circuitry may be arranged on one or more dies in a semiconductor package. The processing circuitry may include tone plan 260 or, alternatively, may read tone plan 260 from memory arranged within the semiconductor device or coupled to the semiconductor device.

Figure 6:
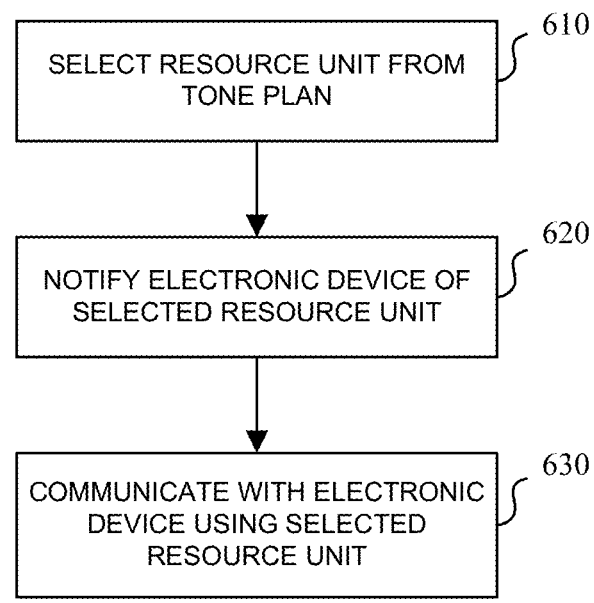
FIG. 6 is a block diagram illustrating components of an electronic device in accordance with aspects of the subject technology.

FIG. 6 is a flowchart illustrating an example process for wireless communications between electronic devices according to aspects of the subject technology. For explanatory purposes, the blocks of the process illustrated in FIG. 6 are described herein as occurring in serial, or linearly. However, multiple blocks of the process may occur in parallel. In addition, the blocks of the process need not be performed in the order shown and/or one or more blocks of the process need not be performed and/or can be replaced by other operations.

Process 600 depicted in FIG. 6 includes a communication module selecting a resource unit from a distributed tone plan (block 610). The selection of the resource unit may be part of a larger process of establishing a wireless communication link with another electronic device. As noted above, the selection of the resource unit may be based on a number of factors including, but not limited to, type of data (e.g., media stream, messaging, data storage, monitoring, etc.), expected data rate, quality-of-service (QoS) guarantees, and/or communication capabilities of the other electronic device. The selection may include more than one resource unit of the same size or of different sizes based on the factors above. The communication module may notify the other electronic device of the selected resource unit(s) via the wireless network interface (block 620). The communication module may then communicate data with the other electronic device via the wireless network interface (block 630).

Figure 7:
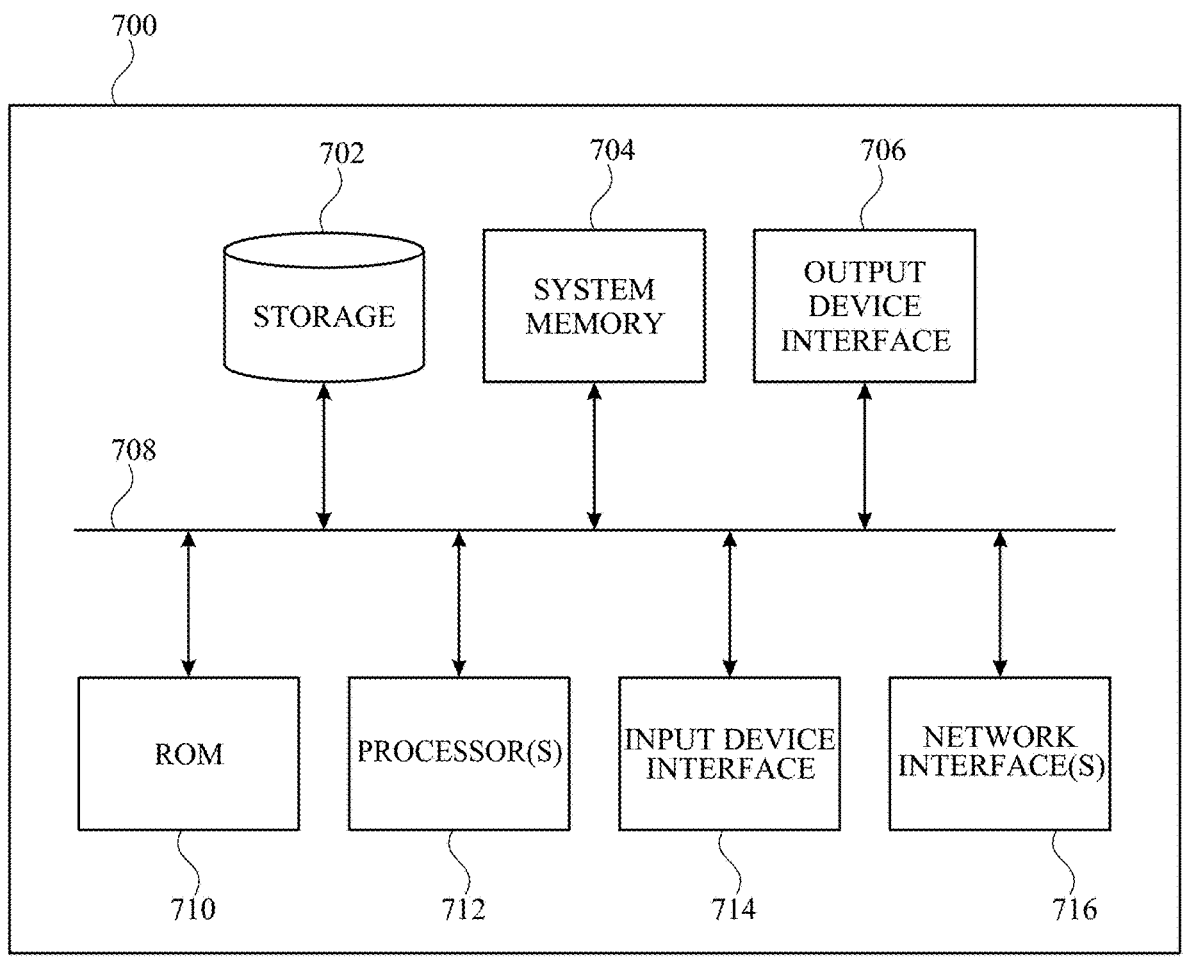
FIG. 7 illustrates an electronic system with which one or more implementations of the subject technology may be implemented.

FIG. 7 illustrates an electronic system 700 with which one or more implementations of the subject technology may be implemented. Not all of the depicted components may be required, however, and one or more implementations may include additional components not shown in the figure. Variations in the arrangement and type of the components may be made without departing from the spirit or scope of the claims as set forth herein. Depicted or described connections or couplings between components are not limited to direct connections or direct couplings and may be implemented with one or more intervening components unless expressly stated otherwise.

The electronic system 700 can be, and/or can be a part of, one or more of electronic devices 110, 120, and 130 and base station/access point 140 shown in FIG. 1. The electronic system 700 may include various types of computer readable media and interfaces for various other types of computer readable media. The electronic system 700 includes a bus 708, one or more processing unit(s) 712, a system memory 704 (and/or buffer), a ROM 710, a permanent storage device 702, an input device interface 714, an output device interface 706, and one or more network interfaces 716, or subsets and variations thereof.

The bus 708 collectively represents all system, peripheral, and chipset buses that communicatively connect the numerous internal devices of the electronic system 700. In one or more implementations, the bus 708 communicatively connects the one or more processing unit(s) 712 with the ROM 710, the system memory 704, and the permanent storage device 702. From these various memory units, the one or more processing unit(s) 712 retrieves instructions to execute and data to process in order to execute the processes of the subject disclosure. The one or more processing unit(s) 712 can be a single processor or a multi-core processor in different implementations.

The ROM 710 stores static data and instructions that are needed by the one or more processing unit(s) 712 and other modules of the electronic system 700. The permanent storage device 702, on the other hand, may be a read-and-write memory device. The permanent storage device 702 may be a non-volatile memory unit that stores instructions and data even when the electronic system 700 is off. In one or more implementations, a mass-storage device (such as a magnetic or optical disk and its corresponding disk drive) may be used as the permanent storage device 702.

In one or more implementations, a removable storage device (such as a floppy disk, flash drive, and its corresponding disk drive) may be used as the permanent storage device 702. Like the permanent storage device 702, the system memory 704 may be a read-and-write memory device. However, unlike the permanent storage device 702, the system memory 704 may be a volatile read-and-write memory, such as random access memory. The system memory 704 may store any of the instructions and data that one or more processing unit(s) 712 may need at runtime. In one or more implementations, the processes of the subject disclosure are stored in the system memory 704, the permanent storage device 702, and/or the ROM 710. From these various memory units, the one or more processing unit(s) 712 retrieves instructions to execute and data to process in order to execute the processes of one or more implementations.

The bus 708 also connects to the input and output device interfaces 714 and 706. The input device interface 714 enables a user to communicate information and select commands to the electronic system 700. Input devices that may be used with the input device interface 714 may include, for example, alphanumeric keyboards and pointing devices (also called "cursor control devices"). The output device interface 706 may enable, for example, the display of images generated by electronic system 700. Output devices that may be used with the output device interface 706 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 7, the bus 708 also couples the electronic system 700 to one or more networks and/or to one or more network nodes through the one or more network interface(s) 716. Network interface(s) 716 may include a transmitter and a receiver, as well as one or more antennas, configured to send and receive signals, packets, frames, symbols, etc. over a transmission medium, as well as other components for processing data for transmission and processing received data. In this manner, the electronic system 700 can be a part of a network of computers (such as a LAN, a wide area network ("WAN"), or an Intranet, or a network of networks, such as the Internet. Any or all components of the electronic system 700 can be used in conjunction with the subject disclosure.

According to aspects of the subject technology, an electronic device is provided that includes a wireless network interface and at least one processor coupled to the wireless network interface. The at least one processor is configured to select a resource unit from a tone plan, notify another electronic device of the selected resource unit via the wireless network interface, and communicate data with the other electronic device using the selected resource unit via the wireless network interface. The tone plan is characterized by a first tone sub-plan comprising a first plurality of resource units having a first size, wherein each resource unit of the first plurality of resource units includes a respective plurality of tones from a contiguous range of tones, and wherein the tones of each respective plurality of tones have a spacing in the contiguous range of tones of an integer multiple of a first factor greater than one.

The first factor may be equal to a number of resource units in the first plurality of resource units. The tone plan may be further characterized by a second tone sub-plan comprising a second plurality of resource units having a second size larger than the first size, wherein each resource unit of the second plurality of resource units includes a respective plurality of tones from the contiguous range of tones, and wherein the tones of each respective plurality of tones in the second tone sub-plan have a spacing in the contiguous range of tones of an integer multiple of a second factor smaller than the first factor. The first factor may be an integer multiple of the second factor. The first factor may equal the second factor multiplied by two.

The tone plan may be further characterized by a third tone sub-plan comprising a third plurality of resource units having a third size larger than the first size, wherein each resource unit of the third plurality of resource units includes the respective pluralities of tones of a plurality of resource units from the first plurality of resource units. The contiguous range of tones may be within a communication channel that has a bandwidth of 20 MHz, 40 MHz, or 80 MHz. The data may be communicated with the other electronic device using the selected resource unit in an orthogonal frequency division multiple access (OFDMA) modulation scheme.

According to aspects of the subject technology, a method is provided that includes selecting a resource unit from a tone plan, notifying another electronic device of the selected resource unit via a wireless network interface, and communicating data with the other electronic device, via the wireless network interface, using the selected resource unit in an orthogonal frequency division multiple access (OFDMA) modulation scheme. The tone plan is characterized by a first tone sub-plan comprising a first plurality of resource units having a first size, wherein each resource unit of the first plurality of resource units includes a respective plurality of tones from a contiguous range of tones, and wherein the tones of each respective plurality of tones have a spacing in the contiguous range of tones of an integer multiple of a number of resource units in the first plurality of resource units.

The tone plan may be further characterized by a second tone sub-plan comprising a second plurality of resource units having a second size larger than the first size, wherein each resource unit of the second plurality of resource units includes a respective plurality of tones from the contiguous range of tones, and wherein the tones of each respective plurality of tones in the second tone sub-plan have a spacing in the contiguous range of tones of an integer multiple of a factor. The factor may be equal to half the number of resource units in the first plurality of resource units.

The tone plan may be further characterized by a third tone sub-plan comprising a third plurality of resource units having a third size larger than the first size, wherein each resource unit of the third plurality of resource units includes the respective pluralities of tones of a plurality of resource units from the first plurality of resource units. The contiguous range of tones may be within a communication channel that has a bandwidth of 20 MHz, 40 MHz, or 80 MHz.

According to aspects of the subject technology, a semiconductor device is provided that includes processing circuitry configured to select a resource unit from a tone plan, notify another electronic device of the selected resource unit via a wireless network interface, and communicate data with the other electronic device, via the wireless network interface using the selected resource unit in an orthogonal frequency division multiple access (OFDMA) modulation scheme. The tone plan is characterized by a first tone sub-plan comprising a first plurality of resource units, each resource unit of the first plurality of resource units having a first number of respective tones from a contiguous range of tones, wherein the tones of each respective resource unit have a spacing in the contiguous range of tones of an integer multiple of a first factor greater than one.

The first factor may be equal to a number of resource units in the first plurality of resource units. The tone plan may be further characterized by a second tone sub-plan comprising a second plurality of resource units, each resource unit of the second plurality of resource units having a second number of respective tones from the contiguous range of tones, wherein the second number is greater than the first number, wherein the tones of each respective resource unit of the second plurality of resource units have a spacing in the contiguous range of tones of an integer multiple of a second factor smaller than the first factor. The first factor may be an integer multiple of the second factor. The first factor may equal the second factor multiplied by two.

The tone plan may be further characterized by a third tone sub-plan comprising a third plurality of resource units, each resource unit having third number of respective tones from the contiguous range of tones, wherein the third number is greater than the first number, wherein each resource unit of the third plurality of resource units includes the respective tones of a plurality of resource units from the first plurality of resource units. The contiguous range of tones may be within a communication channel that has a bandwidth of 20 MHz, 40 MHz, or 80 MHz.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. An electronic device, comprising:
a wireless network interface; and
at least one processor coupled to the wireless network interface, the at least one processor configured to:
select a resource unit from a tone plan;
notify another electronic device of the selected resource unit via the wireless network interface; and
communicate data with the other electronic device using the selected resource unit via the wireless network interface,
wherein the tone plan is characterized by:
a first tone sub-plan comprising a first plurality of resource units having a first size,
wherein each resource unit of the first plurality of resource units includes a respective plurality of tones from a contiguous range of tones, and
wherein the tones of each respective plurality of tones have a spacing in the contiguous range of tones of an integer multiple of a first factor greater than one; and
a second tone sub-plan comprising a second plurality of resource units having a second size larger than the first size,
wherein each resource unit of the second plurality of resource units includes a respective plurality of tones from the contiguous range of tones, and
wherein the tones of each respective plurality of tones in the second tone sub-plan have a spacing in the contiguous range of tones of an integer multiple of a second factor smaller than the first factor.

2. The electronic device of claim 1, wherein the first factor is equal to a number of resource units in the first plurality of resource units.

3. The electronic device of claim 1, wherein the first factor is an integer multiple of the second factor.

4. The electronic device of claim 3, wherein the first factor equals the second factor multiplied by two.

5. The electronic device of claim 1, wherein the tone plan is further characterized by:
a third tone sub-plan comprising a third plurality of resource units having a third size larger than the first size,
wherein each resource unit of the third plurality of resource units includes the respective pluralities of tones of a plurality of resource units from the first plurality of resource units.

6. The electronic device of claim 1, wherein the contiguous range of tones are within a communication channel that has a bandwidth of 20 MHz, 40 MHz, or 80 MHz.

7. The electronic device of claim 1, wherein the data is communicated with the other electronic device using the selected resource unit in an orthogonal frequency division multiple access (OFDMA) modulation scheme.

8. A method, comprising:
selecting a resource unit from a tone plan;
notifying another electronic device of the selected resource unit via a wireless network interface; and
communicating data with the other electronic device, via the wireless network interface, using the selected resource unit in an orthogonal frequency division multiple access (OFDMA) modulation scheme,
wherein the tone plan is characterized by:
   a first tone sub-plan comprising a first plurality of resource units having a first size,
      wherein each resource unit of the first plurality of resource units includes a respective plurality of tones from a contiguous range of tones, and
      wherein the tones of each respective plurality of tones have a spacing in the contiguous range of tones of an integer multiple of a number of resource units in the first plurality of resource units; and
   a second tone sub-plan comprising a second plurality of resource units having a second size larger than the first size,
      wherein each resource unit of the second plurality of resource units includes a respective plurality of tones from the contiguous range of tones, and
      wherein the tones of each respective plurality of tones in the second tone sub-plan have a spacing in the contiguous range of tones of an integer multiple of a second factor smaller than the first factor.

9. The method of claim 8, wherein the factor is equal to half the number of resources units in the first plurality of resources units.

10. The method of claim 8, wherein the tone plan is further characterized by:
   a third tone sub-plan comprising a third plurality of resource units having a third size larger than the first size,
   wherein each resource unit of the third plurality of resource units includes the respective pluralities of tones of a plurality of resource units from the first plurality of resource units.

11. The method of claim 8, wherein the contiguous range of tones are within a communication channel that has a bandwidth of 20 MHz, 40 MHz, or 80 MHz.

12. A semiconductor device, comprising:
processing circuitry configured to:
   select a resource unit a tone plan;
   notify another electronic device of the selected resource unit via the wireless network interface; and
   communicate data with the other electronic device, via the wireless network interface, using the selected resource unit in an orthogonal frequency division multiple access (OFDMA) modulation scheme,
wherein the tone plan is characterized by:
   a first tone sub-plan comprising a first plurality of resource units, each resource unit of the first plurality of resource units having a first number of respective tones from a contiguous range of tones,
      wherein the tones of each respective resource unit have a spacing in the contiguous range of tones of an integer multiple of a first factor greater than one; and
   a second tone sub-plan comprising a second plurality of resource units, each resource unit of the second plurality of resource units having a second number of respective tones from the contiguous range of tones, wherein the second number is greater than the first number; and
      wherein the tones of each respective resource unit of the second plurality of resource units have a spacing in the contiguous range of tones of an integer multiple of a second factor smaller than the first factor.

13. The semiconductor device of claim 12, wherein the first factor is equal to a number of resource units in the first plurality of resource units.

14. The semiconductor device of claim 12, wherein the first factor is an integer multiple of the second factor.

15. The semiconductor device of claim 14, wherein the first factor equals the second factor multiplied by two.

16. The semiconductor device of claim 12, wherein the tone plan is further characterized by:
   a third tone sub-plan comprising a third plurality of resource units, each resource unit having third number of respective tones from the contiguous range of tones, wherein the third number is greater than the first number,
   wherein each resource unit of the third plurality of resource units includes the respective tones of a plurality of resource units from the first plurality of resource units.

17. The semiconductor device of claim 12, wherein the contiguous range of tones are within a communication channel that has a bandwidth of 20 MHz, 40 MHz, or 80 MHz.

* * * * *